US012422100B2

(12) United States Patent
Jones et al.

(10) Patent No.: US 12,422,100 B2
(45) Date of Patent: Sep. 23, 2025

(54) GAS STORAGE AND DISPENSING CONTAINER AND A METHOD OF DISPENSING THEREFROM

(71) Applicant: ENTEGRIS, INC., Billerica, MA (US)

(72) Inventors: Edward E. Jones, Woodbury, CT (US); Joseph R. Despres, Middletown, CT (US); Sarah A. Utz, Beacon, NY (US)

(73) Assignee: ENTEGRIS, INC., Billerica, MA (US)

( * ) Notice: Subject to any disclaimer, the term of this patent is extended or adjusted under 35 U.S.C. 154(b) by 235 days.

(21) Appl. No.: 17/689,610

(22) Filed: Mar. 8, 2022

(65) Prior Publication Data

US 2022/0290812 A1 Sep. 15, 2022

Related U.S. Application Data

(60) Provisional application No. 63/158,749, filed on Mar. 9, 2021.

(51) Int. Cl.
*F17C 7/00* (2006.01)
*F17C 11/00* (2006.01)

(52) U.S. Cl.
CPC ................ *F17C 7/00* (2013.01); *F17C 11/00* (2013.01); *F17C 2201/0114* (2013.01); *F17C 2201/032* (2013.01); *F17C 2205/0338* (2013.01); *F17C 2205/0385* (2013.01); *F17C 2205/0391* (2013.01); *F17C 2205/0394* (2013.01); *F17C 2223/035* (2013.01); *F17C 2270/0518* (2013.01)

(58) Field of Classification Search
CPC .................................. F17C 7/00; F17C 11/00
See application file for complete search history.

(56) References Cited

U.S. PATENT DOCUMENTS

| | | | |
|---|---|---|---|
| 6,257,000 B1 | 7/2001 | Wang | |
| 6,660,063 B2 * | 12/2003 | Tom | B01J 20/20 95/90 |
| 6,959,724 B2 * | 11/2005 | Heiderman | F17C 13/04 137/613 |
| 8,573,441 B2 | 11/2013 | Udischas et al. | |
| 9,128,491 B2 | 9/2015 | Kremer et al. | |
| 9,897,257 B2 * | 2/2018 | Despres | G05D 16/0402 |
| 11,333,302 B2 * | 5/2022 | Despres | F17C 11/00 |
| 2020/0088352 A1 | 3/2020 | Despres et al. | |

FOREIGN PATENT DOCUMENTS

| | | | |
|---|---|---|---|
| CN | 108027106 | A | 5/2018 |
| CN | 217875276 | U | 11/2022 |
| EP | 3455547 | A1 | 3/2019 |
| KR | 20190113320 | A | 10/2019 |
| TW | 496942 | B | 8/2002 |
| TW | 200402517 | A | 2/2004 |
| WO | 2014074746 | A2 | 5/2014 |
| WO | 2019108427 | A1 | 6/2019 |
| WO | 2019190123 | W | 10/2019 |

* cited by examiner

*Primary Examiner* — Yong L Chu

(57) ABSTRACT

A gas storage and dispensing container includes a storage vessel, a first gas pressure regulator, and a second gas pressure regulator. The storage vessel is configured to contain a pressurized gas. The gas storage and dispensing container has a discharge flow path for discharging the pressurized gas. The first gas pressure regulator is disposed within the storage vessel, and the second gas pressure regulator is external to the storage vessel. The discharge flow path extends through the first gas pressure regulator and the second gas pressure regulator. A method of discharging gas from a gas storage and dispensing container includes a first gas pressure regulator reducing a pressure of the pressurized gas to a first pressure and a second gas pressure regulator reducing the pressure of the pressurized gas to a second pressure.

19 Claims, 2 Drawing Sheets

GAS STORAGE AND DISPENSING CONTAINER AND A METHOD OF DISPENSING THEREFROM

FIELD

This disclose relates to gas storage and dispensing containers for storing pressurized gas. More particularly, this disclosure relates to gas storage and dispensing containers that dispense stored pressurized gas at a reduced pressure.

BACKGROUND

Gas storage and dispensing containers can be used to supply gases in industrial processes. Such containers can be configured to contain a high pressure to increase the amount of gas contained. A gas storage and dispensing container can be configured to supply its pressurized gas at a significantly lower pressure. For example, industrial processes, such as semiconductor manufacturing processes, can utilize a gas that is dangerous (e.g., toxic, acidic, flammable, etc.) and/or expensive. Gas storage and dispensing containers also can be used for transporting such dangerous and/or expensive gases.

SUMMARY

This disclosure relates to gas storage and dispensing containers for storing pressurized gas and a method of dispensing stored gas from the containers. The gas storage and dispensing container includes a gas regulator assembly having a gas pressure regulator inside a storage vessel of the container and another gas pressure regulator outside the vessel of the container.

In an embodiment, a gas storage and dispensing container includes a storage vessel, a first gas pressure regulator, and a second gas pressure regulator. The storage vessel has an interior volume for holding pressurized gas. The first gas pressure regulator is disposed within the interior volume of the storage vessel, and the second gas pressure regulator is disposed external to the storage vessel. The container also includes a discharge flow path for discharging the pressurized gas from the gas storage and dispensing container. The discharge flow path extends through the first gas pressure regulator and the second gas pressure regulator.

In an embodiment, a method of discharge gas from a gas storage and dispensing container is for dispensing pressurized gas stored in an interior volume of a storage vessel of the gas storage and dispensing container. The method includes the container having a first gas pressure regulator reducing a pressure of the pressurized gas to a first pressure, and a second gas pressure regulator reducing the pressure of the pressurized gas from the first pressure to a second pressure. The first gas pressure regulator is disposed within the interior volume of the storage vessel. The second pressure regulator is located external to the storage vessel.

DRAWINGS

References are made to the accompanying drawings that form a part of this disclosure, and which illustrate embodiments in which the gas storage and dispensing container described herein can be practiced.

DETAILED DESCRIPTION

Figure 1:
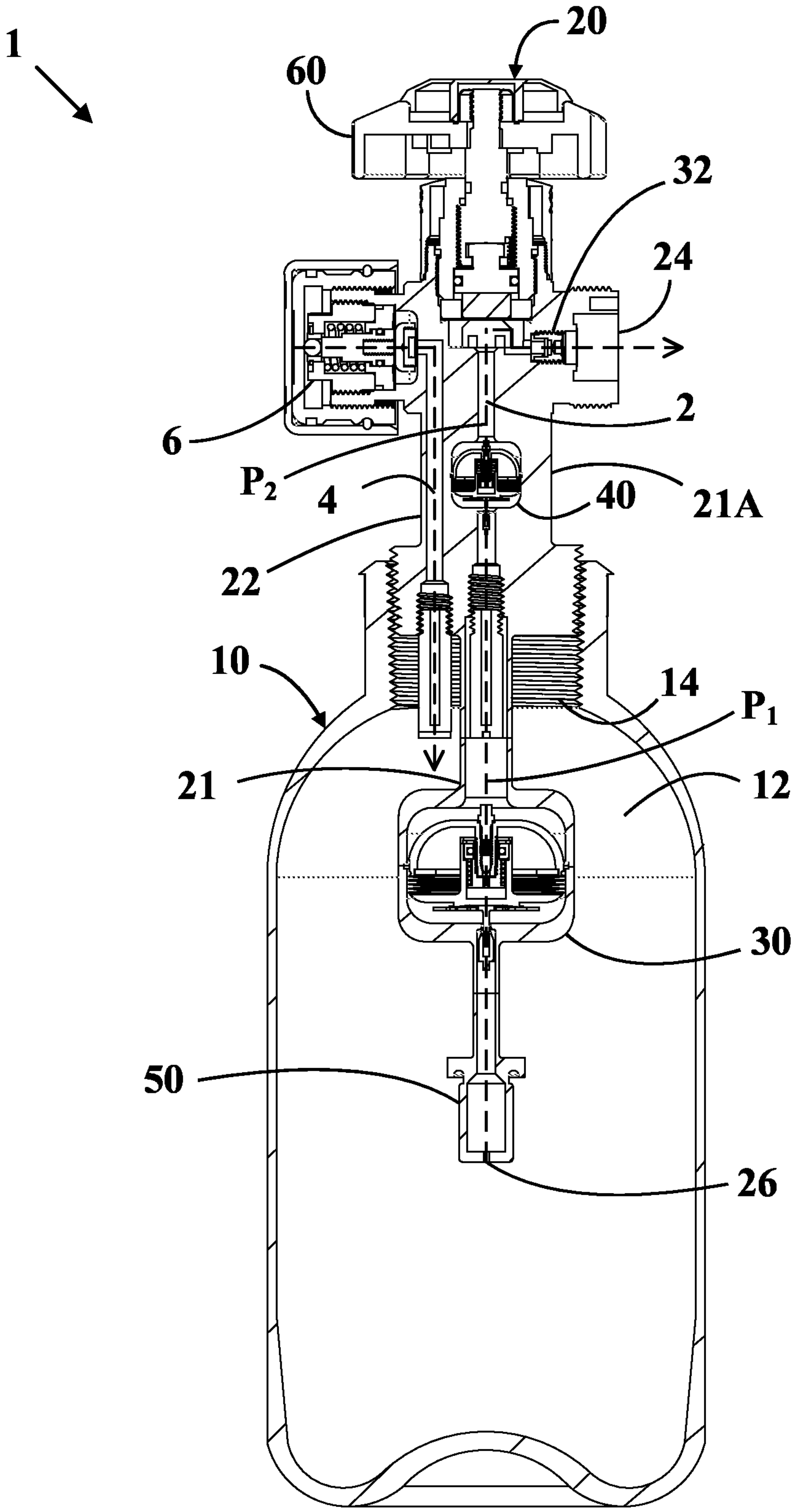
FIG. 1 is a cross-section of an embodiment of a gas storage and dispensing container.

FIG. 1 is a cross sectional view of an embodiment of a gas storage and dispensing container 1. The container 1 is configured to contain a pressurized gas and discharge the gas at a predetermined pressure, for example at lower pressure than that of the pressurized gas. The container 1 includes a storage vessel 10 for storing the pressurized gas and a gas regulator assembly 20 for discharging the stored gas at a lower pressure. The gas regulator assembly 20 extends from within the storage vessel 10 to the outside of the storage vessel 10. The gas regulator assembly 20 is configured to reduce the pressure of the pressurized gas as it flows through gas regulator assembly 20 such that the gas is discharged from the container 1 at a lower pressure than its stored pressure within the container 1. The gas regulator assembly 20 includes a first gas pressure regulator 30 and a second gas pressure regulator 40, that is adjustable or nonadjustable that reduces the pressure of the gas as it flows through the gas regulator assembly 20 and is discharged from the container 1. The second gas pressure regulator can further reduce the pressure of the gas, 25%, 35%, 45% or more based on the settings of the second gas pressure regulator. The first pressure regulator 30 is an internal pressure regulator (e.g., disposed within the storage vessel 10) that reduces the pressure the gas by a first amount within the storage vessel 10, and the second pressure regulator 40 is an external pressure regulator (e.g., located external to the storage vessel 10) that further reduces the pressure of the pressurized gas by a second amount outside of the storage vessel 10.

There are several advantages of having a second gas pressure regulator in series with a first gas pressure regulator. For example, the first gas pressure regulator and the second gas pressure regulator in series provides a stable (constant) delivery pressure to the process/implant tool over the full lifetime of the gas dispensing and storage container the improved stability is achieved by reducing the range of the inlet pressure to the second stage regulator as the pressure within the gas dispensing and storage container transitions from high to low Further advantage includes that the series of gas pressure regulators that reduces the pressure also reduces the release rate of the gas in turn allowing for a safety advantage in the event of an issue or leak in the gas dispensing and storage container. Another example is that due to the series of gas pressure regulators the gas the flow rate is more controlled due to the lack of excess of gas released from the second gas pressure regulator. This may, in result, reduce the complexity of the system the gas dispensing and storage container is connect to. Further advantage includes that adjustability of the second gas pressure regulator that allows for flexibility of application of the gas dispensing and storage container. This allows the customer or the supplier to adjust the delivery pressure of the gas dispensing and storage container to be applicable to multiple industries, including but not limited to, implant, solar panel, flat panel or LED.

The container 1 includes a discharge flow path 2 for discharging the pressurized gas from the container 1. As shown in FIG. 1, the gas regulator assembly 20 includes and forms the discharge flow path 2. The discharge flow path 2 extends through the gas regulator assembly 20. The discharge flow path 2 extends through the first gas pressure regulator 30 and the second pressure regulator 40 in series within the gas regulator assembly 20. The container 1 is configured so that the pressurized gas can only be discharged from the container 1 through the discharge flow path 2. In an embodiment, the pressurized gas only is able to flow out of the container 1 by passing through the gas regulator assembly 20.

The container 1 can also include a fill flow path 4 that is sealed during times when the container 1 is not being filled. As shown in FIG. 1, the gas pressure regulator 20 can include and form the fill flow path 4. The fill flow path 4 can extend through the gas pressure regulator 20. The fill flow path 4 being sealed after the container 1 has been filled with the gas to a desired pressure. As shown in FIG. 1, the fill flow path 4 is separate from the discharge flow path 2. The container 1 can include an inlet valve 6 that is one-way valve that prevents gas from being discharged through the fill flow path 4 (e.g., the pressurized gas from flowing backwards through the fill flow path 4). The fill flow path 4 extends through the inlet valve 6.

The container 1 can contain one of a variety of suitable gases. In an embodiment, the gas within the container 1 is a gas used in semiconductor manufacturing. For example, the gas can include, but is not limited to, a hydride gas (e.g., arsine, phosphine, stibine, silane, diborane, etc.), an acidic gas (e.g., halogenated gases, hydrogen-halogen complex gases, halogenated silanes, etc.), or the like used in semiconductor manufacturing. In some embodiments, the gas can be a mixture of different types of gases (e.g., a mixture of boron trifluoride and hydrogen, a mixture of germanium tetrafluoride and hydrogen, etc.).

The storage vessel 10 includes an interior volume 12 and an opening 14. The pressurized gas is stored within the interior volume 12. The gas regulator assembly 20 has an upper portion 22 and a lower portion 21. The lower portion 21 is directly coupled to the upper portion 22. In some embodiments, the lower portion 21 may be welded to the upper portion 22. The upper portion 22 of the gas regulator assembly 20 is mounted to the opening 14 of the storage vessel 10. The lower portion 21 extends from the upper portion 22 into the interior space 12 of the vessel 10. For example, as shown in FIG. 1, the lower portion 21 extends from the opening 14 downwards into the interior space 12 of the storage vessel 10. All of the bottom portion 21 is disposed within the storage vessel 10.

For example, the upper portion 21 is coupled to the opening 14 to seal the opening 14 of the storage vessel 10. The seal formed between the exterior of the upper portion 22 and the interior wall of the opening 14. The seal is configured to contain the pressurized gas in the interior volume 12 of the storage vessel 10, except for through the gas regulator assembly 20. The pressure of the gas contained within the storage vessel 10 is discussed in more detail below. As shown in FIG. 1, the opening 14 can include threads, and the gas regulator assembly 20 can be coupled to the opening 14 by screwing the gas regulator assembly 20 into the threads of the opening 14. More specifically, the gas regulator assembly 20 in an embodiment can be coupled to the opening 14 by screwing the upper portion 22 of the gas regulator assembly 20 into the opening 14 of the storage vessel 10. The upper portion 22 of the gas regulator assembly 20 can include threads that screw into the threads in the opening 14 of the storage vessel 10. In some embodiments, a sealant can be used to ensure sealing between the storage vessel 10 and the gas regulator assembly 20. For example, a lubricant used to prevent galling, such as Teflon tape or paste, can also act as the sealant. The gas regulator assembly 20 is discussed in more detail below.

The pressurized gas is stored within the internal volume 12 of the storage vessel 10. The container 1 can be configured to contain the pressurized gas with a pressure of 100 pounds per a square inch gauge (psig) or greater. In an embodiment, the container 1 contains the pressurized gas at a pressure of 200 psig. In an embodiment, the container 1 contains the pressurized gas at a pressure of 700 psig, or 800 psig, or greater. In an embodiment, the container 1 contains the pressurized gas at a pressure of 2000 psig or greater. In one embodiment, the container 1 contains the pressurized gas at a pressure of 2200 psig. In one embodiment, the container 1 contains the pressurized gas at a pressure of 2300 psig. The container 1 operates to discharge the pressurized gas at a pressure lower than the internal pressure of the container 1. The gas regulator assembly 20 controls the discharge pressure of the gas from the container 1.

The gas regulator assembly 20 includes a discharge inlet 26 and a discharge outlet 24. The discharge inlet 26 is located within the internal volume 12 of the storage vessel 10. The discharge outlet 24 is located external to the storage vessel 10. The discharge flow path 2 extends from the discharge inlet 26 to the discharge outlet 24. Gas is discharged from the container 1 by entering the discharge inlet 26, flowing through the discharge flow path 2, and then exiting through the discharge outlet 24. In an embodiment, part of the fill path 4 may overlap with the discharge flow path 2.

The gas regulator assembly 20 includes a first gas pressure regulator 30 and a second gas pressure regulator 40. As shown in FIG. 1, the upper portion 22 of the gas regulator assembly 20 includes the inlet of the container (e.g., the inlet of the fill flow path 4), the outlet of the container 1 (e.g., discharge outlet 24 of the discharge flow path 2), and the second gas pressure regulator 40. The upper portion 21 can also include the inlet valve 6 and the adjustable flow valve 60. The lower portion 22 of the gas regulator assembly 20 includes the second pressure regulator 30 and a filter 50.

The first gas pressure regulator 30 is disposed within the interior volume 12 of the storage vessel 10. The second gas pressure regulator 40 is located external to the storage vessel 10. As shown in FIG. 1, the discharge flow path 2 extends through both of the gas pressure regulators 30, 40. The gas pressure regulators 30, 40 are configured to control the pressure of the gas discharged from the container 1. The gas pressure regulators 30, 40 decrease the pressure of the gas as it flows through and out of the discharge flow path 2. The container 1 can externally discharge the gas at a significantly lower pressure than the pressure at which the gas is stored within the container 1.

As shown in FIG. 1, the gas regulator assembly 20 may include a filter 50 and an adjustable flow valve 60. The discharge flow path 2 extends through the filter 50 and the adjustable flow valve 60. The filter 50 can be located at the discharge inlet 26 of the discharge flow path 2. For example, the filter 50 can be configured to prevent solid and/or liquid materials from entering the discharge flow path 2. Additional filter or filters (not shown) may be added to the second gas pressure regulator 40 and/or the inlet valve 6 and/or the discharge flow path 2.

The gas regulator assembly 20 may also include a restrictive flow orifice 32 in the discharge flow path 2. As shown in FIG. 1, the restrictive flow orifice 32 can be provided at the discharge outlet 24 of the gas regulator assembly 20. The restrictive flow orifice 32 limits the maximum flow rate of gas through the discharge flow path 2 at which the gas is allowed to be discharged from the gas regulator assembly 20. For example, in the event that the gas pressure regulators fail, the restrictive flow orifice 32 limits the flow of gas through the discharge flow path 2 and prevents an immediate large discharge of the pressurized gas from the container 1.

The adjustable flow valve 60 is a flow control valve that is adjustable to adjust the flow rate through the discharge flow path 2. The adjustable flow valve 60 has at least an open position and a closed position. In the open position, the flow valve 60 allows the gas to flow through the flow valve 60 and the discharge flow path 2. In the closed position, the flow valve 60 blocks flow through the discharge flow path 2 (e.g., prevents discharge of the pressurized gas from the container 1). The adjustable flow valve 60 may also include one or more positions between the open position and the closed position. The flow control valve 60 in FIG. 1 is a manual valve that can be manually operated by hand. In another embodiment, the flow control valve 60 may be a pneumatic flow control valve. The flow control valve 60 in FIG. 1 is disposed between the second pressure regulator 40 and the discharge outlet 24, which is downstream of the first gas pressure regulator 30 and the second gas pressure regulator 40 in the discharge flow path 2. However, the flow control valve 60 may be disposed in a different location in other embodiments. In an embodiment, the flow control valve 60 may be disposed between first gas pressure regulator 30 and the second gas pressure regulator 40, so as to be downstream of the first gas pressure regulator 30 and upstream of the second gas pressure regulator 40 in the discharge flow path.

The second gas pressure regulator 40 is downstream of the first gas pressure regulator 30 in the discharge flow path 2. Within the discharge flow path 2, the gas passes through the first gas pressure regulator 30 then through the second gas pressure regulator 40. The first gas pressure regulator 30 may reduce pressure of the pressurized gas flowing the discharge flow path 2 by a first amount, and the second gas pressure regulator 40 further may reduce the pressure of the gas flowing from the first gas pressure regulator 30 by a second amount. The first gas pressure regulator 30 discharges gas at a first pressure $P_1$ and the second pressure regulator 40 discharges gas at a second pressure $P_2$ that can be less than the first pressure $P_1$ (e.g., $P_2<P_1$). In an embodiment, the discharge pressure $P_1$ of the first pressure regulator 30 is at or less than 500 psig, for example 450 psig or 300 psig. In an embodiment, the discharge pressure $P_1$ of the first pressure regulator 30 is at or less than 200 psig. In an embodiment, the discharge pressure $P_1$ of the first pressure regulator 30 is at or about 100 psig. In an embodiment, the discharge pressure $P_1$ of the first pressure regulator 30 is at or about 25 psig.

In an embodiment, the first pressure regulator 30 is configured to be non-adjustable within the container 1. The first pressure regulator 30 is configured to have a set pressure reduction setting. In an embodiment, the pressure reduction setting of the first pressure regulator 30 is only changeable by disassembling the container 1 (e.g., removing/unmounting the gas regulator assembly 20 from the storage vessel 10). In another embodiment, the first pressure regulator 30 may have a structure that does not have an adjustable discharge pressure.

The second pressure regulator 40 receives the set pressure gas from the first pressure regulator 30. The second pressure regulator 40 receives the gas at the discharge pressure $P_1$ of the first pressure regulator 30. For example, the second pressure regulator 40 reduces the pressure of the gas from the first pressure $P_1$ to the second pressure $P_2$. The second pressure regulator 40 controls the pressure at which the gas is discharged from the container 1. For example, gas discharged from the discharge outlet 2 is at the discharge pressure $P_2$ of the second pressure regulator 30.

In an embodiment, the pressure reduction setting of the second pressure regulator 40 is adjustable. The pressure reduction setting controls the discharge pressure $P_2$ of the second pressure regulator 40. The pressure reduction setting of the second pressure regulator 40 may be adjustable even while the container is in use (e.g., while the container 1 is assembled). For example, the pressure reduction setting of the second pressure regulator 40 can be adjusted while the container 1 is pressurized with gas. In an embodiment, the pressure reduction setting of the second pressure regulator 40 may be accessible through the flow valve 60. In an embodiment, the pressure reduction setting of the second pressure regulator 40 may be accessible through the discharge outlet 24. In another embodiment, the housing of the gas regulator assembly 20 may include a separate opening for accessing the pressure reduction setting of the second pressure regulator 40.

The second gas pressure regulator, 40, adjustability allows for additional safety controls and usability to the supplier, customer, and end user system. The adjustment can range based on the application, however, in some applications the pressure would be at a sub atmospheric condition or at the outlet set point of the first gas pressure regulator. In other non-limiting examples, the pressure can be adjusted to 25 psig, or 50 psig, or 100 psig, or 150 psig or any value that would be beneficial to an application. The adjustment can also be completed while in use or pre determined at the time of attaching the gas dispensing and storage container to a fleet or application. The adjustment can also be done remotely via software systems or at the gas dispensing and storage container. The remote control to the adjustability allows for more flexibility for the commercial capabilities and usability of the gas dispensing and storage container.

The second pressure regulator 40 is adjustable to have a discharge pressure $P_2$ that can be 30 psig or less. The second pressure regulator 40 can be configured to have a discharge pressure $P_2$ of 25 psig. In some embodiments, the second pressure regulator 40 is adjustable to have a discharge pressure $P_2$ that is less than atmospheric pressure. For example, in such a configuration, a vacuum may be applied to the discharge outlet 24 to discharge gas from the container 1.

Figure 2:
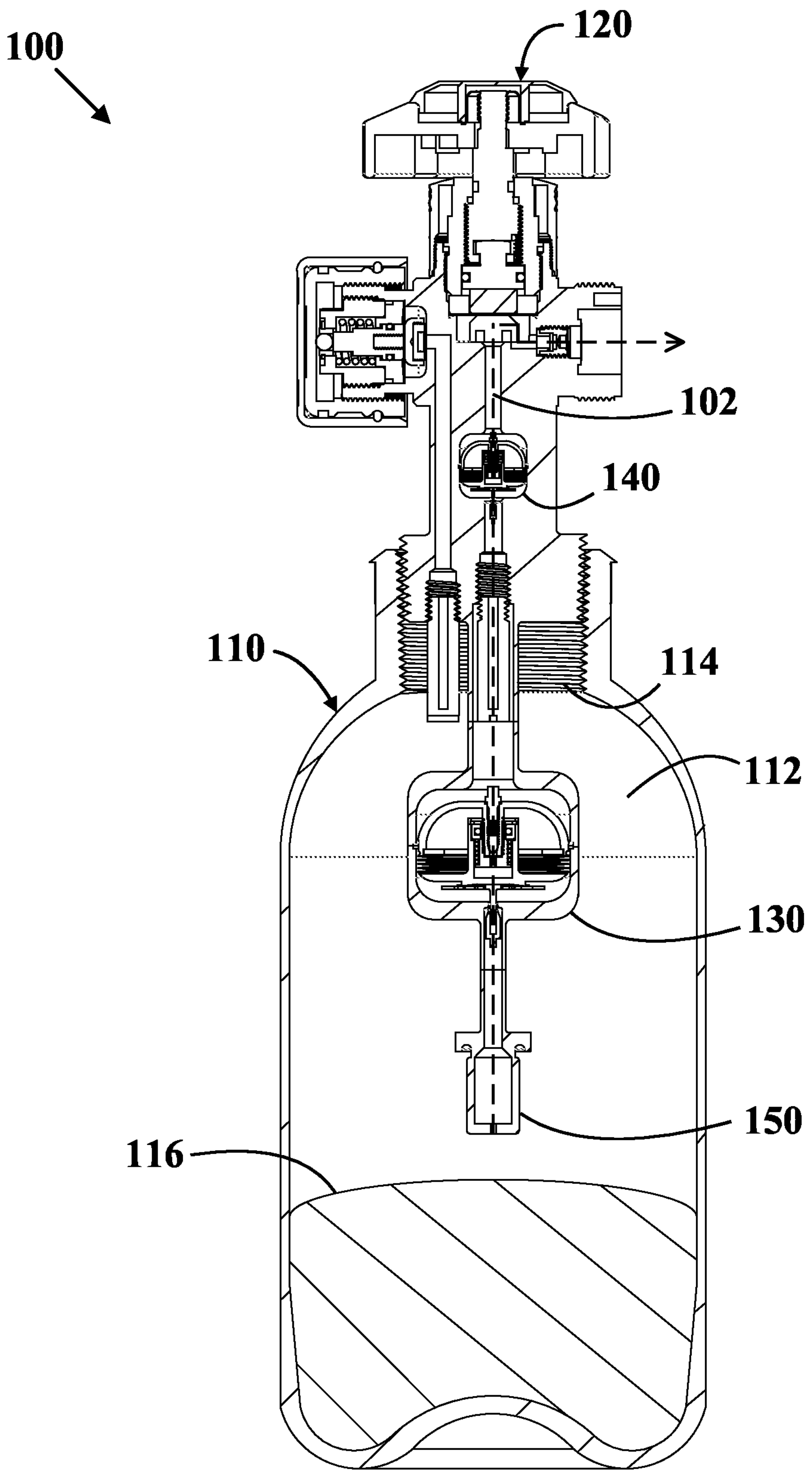
FIG. 2 is a cross-section of another embodiment of a gas storage and dispensing container.

FIG. 2 is a cross sectional view of another embodiment of a gas storage and dispensing container 100. The container 100 is configured to contain a pressurized gas and discharge the gas at a predetermined pressure, for example at lower pressure. Similar to the container 1 in FIG. 1, the container 100 includes a discharge flow path 102 for discharging the pressurized gas from the container 100 and is configured so that the pressurized gas can only be discharged from the container 100 through the discharge flow path 102. As shown in FIG. 2, the gas storage and dispensing container 100 includes a storage vessel 110 and a gas regulator assembly 120. The storage vessel 110 and the gas regulator assembly 120 can have a similar configuration as discussed above for storage vessel 10 and the gas regulator assembly 12 in FIG. 1. For example, the storage vessel 110 has an internal volume 112 for storing the pressurized gas; and the gas regulator assembly 120 is coupled to an opening 114 of the storage vessel 110 and includes a first gas pressure regulator 130 disposed within the storage vessel 110 and a second gas pressure regulator 140 located external to the storage vessel 110 included in the discharge flow path 102. For example, the gas regulator assembly 120 may include a filter 150 configured to prevent solid and/or liquid materials from entering the discharge flow path 2.

In an embodiment, a portion of the gas can be stored within the interior volume 112 in one or more of an adsorbed state and/or a liquid state. For example, the pressure within the storage vessel 110 causes gas within the storage vessel 110 to be liquefied and/or adsorbed within the interior volume 112. As gas is discharged from the container 100, adsorbed gas and liquefied gas return to the gaseous state within the storage vessel 110 and is then discharged in the gaseous state from the container 100.

As shown in FIG. 2, the container 100 can include a solid adsorbent 116 in the internal volume 112 for adsorbing gas. For example, the filter 150 can be configured to prevent the solid adsorbent from entering the discharge flow path 102. The solid adsorbent 116 can be utilized to increase the capacity of the container 100. The adsorbent 116 adsorbs gas as the interior volume 112 is filled and pressurized with gas. As the gas is discharged from the interior volume 112, the gas within the adsorbent 116 is desorbed into the open space of the interior volume 112 of the container 110. In an embodiment, the adsorbent 116 may desorb gas until the interior volume 112 is fully depleted (e.g., reaches at or about atmospheric pressure). In an embodiment, the adsorbent 116 may desorb until the interior volume 112 reaches a sub-atmospheric pressure (e.g., reaches a pressure of less than 760 torr and more than 550 Torr or a pressure of less than 760 torr and more than 650 torr). In another embodiment, the adsorbent 116 may desorb until the interior volume 112 reaches a sub-atmospheric pressure of less than 550 Torr. Thus, with the adsorbent 116, a greater mass of gas can be stored in the container 100. The solid adsorbent 116 can be in the form of one or more of granules, particulates, beads, pellets, sheets, and the like. The solid adsorbent 116 is at least one adsorbent selected from adsorbents suitable for the particular gas or the type of gas being stored within the container 100. More than one adsorbent can be included in the container 100. For example, the solid adsorbent 116 can include one or more carbon adsorbent and metal organic framework adsorbent. In an embodiment, the metal organic framework adsorbent can comprise a zeolitic imidazolate framework having transition metal atoms connected by imidazolate linkers. In such an embodiment, the transition metal atoms can be zinc. In an embodiment, metal organic framework adsorbent can include one or more of ZIF—8, Cu—MOF—74, Ni—MOF—74, Mg—MOF—74, MOF—5, PCN—250 (Fe), and Cu—BTC. An embodiment of a storage and dispensing container as described above (e.g., the storage and dispensing container 1 described above, the storage and dispensing container 100 described above, etc.) may be employed in a method of discharging gas from a storage and dispensing container. In an embodiment, the method may be modified according to utilize the storage and dispensing container 1 or the storage and dispensing container 100 as described above.

The method can include a first gas pressure regulator (e.g., first pressure regulator 30 and first pressure regulator 130) reducing the pressure of a flow of the pressurized gas contained in an interior volume of a storage vessel (e.g., interior volume 12 of storage vessel 12 and interior volume 114 of storage vessel 112) to a first pressure (e.g., first pressure $P_1$). The first pressure regulator is located within the interior volume of the storage vessel. The first pressure regulator receiving the pressured gas at its stored pressure within the interior volume. The method can also include a second gas pressure regulator (e.g., second pressure regulator 40 and first pressure regulator 140) reducing the pressure of the pressurized gas from the first pressure to a second pressure (e.g., second pressure $P_2$).

The first pressure regulator reducing the pressure of the pressurized gas to the first pressure can include the first pressure regulator discharging the pressurized gas at the second pressure. The second pressure regulator reducing the pressure of the flow of the pressurized gas to the second pressure can include the second gas pressure regulator receiving the pressurized gas at the first pressure from the first gas pressure regulator and discharging the gas at the second pressure. In some embodiments, the second gas pressure regulator may discharge the pressured gas at sub-atmospheric pressures.

The method can also include externally adjusting a pressure reduction setting of the second gas pressure regulator (e.g., second pressure regulator 40 and second pressure regulator 140). For example, the pressure reduction setting being adjusted while the container is assembled.

Aspects

Any of Aspects 1-16 may be combined with any of Aspects 17-19.

Aspect 1. A gas storage and dispensing container, comprising: a storage vessel having an interior volume for holding pressurized gas; a first gas pressure regulator within the interior volume; a second gas pressure regulator external to the storage vessel; and a discharge flow path for discharging the pressurized gas from the gas storage and dispensing container, the discharge flow path extending through the first gas pressure regulator and the second gas pressure regulator.

Aspect 2. The gas storage and dispensing container of aspect 1, further comprising: a gas regulator assembly coupled to an opening of the storage vessel, the gas regulator assembly including the first gas pressure regulator and the second gas pressure regulator and forming the discharge flow path.

Aspect 3. The gas storage and dispensing container of aspect 1 or 2, wherein the gas regulator assembly includes an upper portion that forms a seal in the opening of the storage vessel and a lower portion extending from the upper portion into the interior volume of the storage vessel, the upper portion including the first gas pressure regulator and the lower portion including the second gas pressure regulator.

Aspect 4. The gas storage and dispensing container of any one of aspects 1-3, wherein the first gas pressure regulator discharges the gas at a first pressure, and the second gas pressure regulator discharges the gas at a second pressure that is less than the first pressure.

Aspect 5. The gas storage and dispensing container of aspect 4, wherein the second gas pressure regulator is downstream relative to the first gas pressure regulator in the discharge flow path and receives the gas at or about the first pressure.

Aspect 6. The gas storage and dispensing container of any one of aspects 1-5, wherein the storage vessel is configured to contain the pressurized gas in the interior volume at a pressure of 700 psig or greater.

Aspect 7. The gas storage and dispensing container of any one of aspects 1-6, wherein the first gas pressure regulator is configured to be non-adjustable within the storage vessel.

Aspect 8. The gas storage and dispensing container of any one of aspects 1-7, wherein a pressure reduction setting of the second gas pressure regulator is adjustable while in use.

Aspect 9. The gas storage and dispensing container of aspect 8, wherein the gas is discharged from the outlet of the gas regulator assembly at an outlet pressure controlled by the second gas pressure regulator.

Aspect 10. The gas and storage dispensing container of aspect 9, wherein the outlet pressure of the gas is controllable such that the pressure of the gas discharged from the outlet of the gas regulator assembly is less than atmospheric pressure.

Aspect 11. The gas storage and dispensing container of any one of aspects 1-10, wherein the gas regulator assembly includes an adjustable flow valve external to the storage vessel, the discharge flow path extending through the adjustable flow valve.

Aspect 12. The gas storage and dispensing container of aspect 11, wherein the flow valve has a closed position, the flow valve in the closed position blocking flow of the gas through the gas regulator assembly.

Aspect 13. The gas storage and dispensing container of any one of aspects 1-12, wherein the gas regulator assembly includes a fill flow path that is sealed, the fill flow path being a separate path from the discharge flow path.

Aspect 14. The gas storage and dispensing container any one of aspects 1-13, further comprising: a solid adsorbent disposed within the interior volume of the storage vessel, the solid absorbent containing adsorbed gas and being configured to desorb the adsorbed gas into the interior volume, and the desorbed gas being included in the pressurized gas.

Aspect 15. The gas storage and dispensing container of aspect 14, wherein flow of the pressurized gas into and through the discharge flow path decreases a pressure of the interior volume of the storage vessel causing the desorption of the gas from the solid adsorbent into the interior volume.

Aspect 16. The gas storage and dispensing container of aspect 14, wherein the solid adsorbent includes one or more of a carbon adsorbent and a metal organic framework adsorbent.

Aspect 17. A method of discharging gas from a gas storage and dispensing container, the gas storage and dispensing container including a storage vessel with an interior volume containing pressurized gas, the method comprising: reducing, with a first gas pressure regulator disposed within the interior volume, a pressure of the pressurized gas to a first pressure, and reducing, with a second gas pressure regulator located external to the storage vessel, the pressure of pressurized gas to a second pressure.

Aspect 18. the method of Aspect 17, wherein the reducing the pressure of the pressurized gas to the first pressure includes the first gas pressure regulator discharging the pressurized gas at the first pressure, and the reducing the flow of the pressurized gas to the second pressure includes: the second gas pressure regulator receiving the pressurized gas at the first pressure from the first gas pressure regulator, and the second gas pressure regulator discharging the pressurized gas at the second pressure.

Aspect 19. The method of any one of Aspects 17 and 18, further comprising: externally adjusting a pressure reduction setting of the second gas pressure regulator.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A gas storage and dispensing container, comprising:

a storage vessel having an interior volume for holding pressurized gas;

a valve;

a first gas pressure regulator within the interior volume;

a second gas pressure regulator external to the storage vessel, wherein the second gas pressure regulator is positioned upstream of the valve and downstream of and in line with the first gas pressure regulator; and a discharge flow path for discharging the pressurized gas from the gas storage and dispensing container, the discharge flow path extending through the first gas pressure regulator and the second gas pressure regulator; and a solid adsorbent disposed within the interior volume of the storage vessel, the solid absorbent containing adsorbed gas and being configured to desorb the adsorbed gas into the interior volume, and the desorbed gas being included in the pressurized gas.

2. The gas storage and dispensing container of claim 1, further comprising:

a gas regulator assembly coupled to an opening of the storage vessel, the gas regulator assembly including the first gas pressure regulator and the second gas pressure regulator and forming the discharge flow path.

3. The gas storage and dispensing container of claim 2, wherein the gas regulator assembly further includes an upper portion that forms a seal in the opening of the storage vessel and a lower portion extending from the upper portion into the interior volume of the storage vessel, the upper portion including the second gas pressure regulator and the lower portion including the first gas pressure regulator.

4. The gas storage and dispensing container of claim 1, wherein the first gas pressure regulator discharges the gas at a first pressure, and the second gas pressure regulator receives the gas at or about the first pressure and discharges the gas at a second pressure that is less than the first pressure.

5. The gas storage and dispensing container of claim 1, wherein the storage vessel is configured to contain the pressurized gas in the interior volume at a pressure of at least 550 psig or greater.

6. The gas storage and dispensing container of claim 1, wherein the first gas pressure regulator is configured to be non-adjustable within the storage vessel.

7. The gas storage and dispensing container of claim 1, wherein a pressure setting of the second gas pressure regulator is adjustable.

8. The gas storage and dispensing container of claim 7, wherein a pressure setting of the second gas pressure regulator is adjustable while in use.

9. The gas storage and dispensing container of claim 7, wherein a pressure setting of the second gas pressure regulator can be set as low as 25 psig.

10. The gas storage and dispensing container of claim 7, wherein a pressure setting of the second gas pressure regulator can be set remotely from the gas storage and dispensing container.

11. The gas storage and dispensing container of claim 7, wherein the gas is discharged from the outlet of the gas regulator assembly at an outlet pressure controlled by the second gas pressure regulator.

12. The gas and storage dispensing container of claim 8, wherein the outlet pressure of the gas is controllable such that the pressure of the gas discharged from the outlet of the gas regulator assembly is less than atmospheric pressure.

13. The gas storage and dispensing container of claim 1, wherein the gas regulator assembly includes an adjustable flow valve external to the storage vessel, the discharge flow path extending through the adjustable flow valve.

14. The gas storage and dispensing container of claim 1, wherein the gas regulator assembly includes a fill flow path that is sealed, the fill flow path being a separate path from the discharge flow path.

15. The gas storage and dispensing container of claim 1, wherein the solid adsorbent includes one or more of a carbon adsorbent and a metal organic framework adsorbent.

16. A method of discharging gas from a gas storage and dispensing container, the gas storage and dispensing container including a storage vessel with an interior volume containing pressurized gas, the method comprising:

reducing, with a first gas pressure regulator disposed within the interior volume, a pressure of the pressurized gas to a first pressure; and reducing, with a second gas pressure regulator located external to the storage vessel, the pressure of the pressurized gas from the first pressure to a second pressure.

17. The method of claim 16, wherein the reducing the pressure of the pressurized gas to the first pressure includes the first gas pressure regulator discharging the pressurized gas at the first pressure, and the reducing the pressurized gas to the second pressure includes:

the second gas pressure regulator receiving the pressurized gas at the first pressure from the first gas pressure regulator, and the second gas pressure regulator discharging the pressurized gas at the second pressure.

18. The method of claim 17, further comprising:

externally adjusting a pressure reduction setting of the second gas pressure regulator.

19. The gas storage and dispensing container of claim 1, further comprising a restrictive flow orifice in the discharge flow path downstream of the second gas pressure regulator wherein the discharge flow path extends through the restrictive flow orifice.

* * * * *